United States Patent [19]

Kishi et al.

[11] Patent Number: 4,899,095

[45] Date of Patent: Feb. 6, 1990

[54] ROBOT CONTROL SYSTEM

[75] Inventors: Hajimu Kishi, Hino; Shinsuke Sakakibara, Komae; Tatsuo Karakama, Hachioji, all of Japan

[73] Assignee: Fanuc Ltd, Minamitsuru, Japan

[21] Appl. No.: 32,519

[22] PCT Filed: Jun. 24, 1986

[86] PCT No.: PCT/JP86/00319

§ 371 Date: Feb. 25, 1987

§ 102(e) Date: Feb. 25, 1987

[87] PCT Pub. No.: WO87/00310

PCT Pub. Date: Jan. 15, 1987

[30] Foreign Application Priority Data

Jun. 25, 1985 [JP] Japan .................. 60-138334

[51] Int. Cl.$^4$ ............................................. G05B 19/42
[52] U.S. Cl. ..................... 318/568.16; 318/568.19; 364/513; 901/47
[58] Field of Search ...................... 901/46–47, 901/9, 14–18, 31–32, 41; 318/560–561, 567–568, 569–574, 575–577, 632; 364/573, 167.01

[56] References Cited

U.S. PATENT DOCUMENTS

| 3,804,270 | 4/1974 | Michaud et al. | 901/47 |
| 4,017,721 | 4/1977 | Michaud | 901/47 |
| 4,105,925 | 8/1978 | Rossol et al. | 901/47 |
| 4,373,804 | 2/1983 | Pryor et al. | 901/47 |
| 4,380,696 | 4/1983 | Masaki | 318/568 |
| 4,706,000 | 11/1987 | Kishi et al. | 518/568 |

Primary Examiner—William M. Shoop, Jr.
Assistant Examiner—David Martin
Attorney, Agent, or Firm—Staas & Halsey

[57] ABSTRACT

A robot control system is provided for teaching the distal end position of a working member mounted on a wrist of a robot and executing a predetermined task. A rotational angle is determined by a calculation control unit (/w) from the projection (/w') of a gripping direction vector of a workpiece. A command for correcting the positional rotation of the tool coordinate system is obtained through simple processing based on information indicative of the position of the workpiece from a sensor. As a result, the position of the tool can be rotatively corrected and controlled, even if the gripping direction vector is not parallel to the surface on which the workpiece is placed.

6 Claims, 1 Drawing Sheet

ROBOT CONTROL SYSTEM

BACKGROUND OF THE INVENTION

This invention relates to a robot control system in which a predetermined task is executed by teaching a robot a position (hereafter referred to as "TCP") of a distal end of a working member (tool) mounted on a wrist of the robot.

When parts are assembled by using an industrial robot, it is necessary for prescribed parts to be repeatedly supplied to a set position at a predetermined timing by a parts feeder, which supplies the parts automatically. However, parts delivered in a flow by a conveyor belt, or the like, cannot always be accurately supplied to the same position every time. Accordingly, an offset for the TCP that has already been taught for the hand must be corrected by reading, via a TV camera, or the like, position information relating to the part to be manipulated, and feeding the information into the robot each time.

In such cases, in accordance with the prior art, an amount of rotational correction obtained from a sensor such as a camera is calculated in terms of displacement of the a rotational angle with regard to three basic axes of a hand vector. The tool offset at a taught position, serving as the origin of the correction, is corrected by a G45 preparatory code for a position rotating correction.

The position information sent to a robot from the sensor side is data indicative of an angle defined by a workpiece gripping direction vector, obtained by data processing on the sensor side, and a predetermined axis, e.g. the Xs axis, of the sensor coordinate system. Meanwhile, a robot calculation control unit stores the sensor coordinates upon converting them into data in the robot coordinate system. Consequently, when a rotational correction is performed which brings a unit vector (reference vector) in the direction of a predetermined axis, e.g., the Yt axis, of the tool coordinate system into coincidence with a gripping direction vector, of the workpiece, which of the Xt, Yt and Zt axes of the tool coordinate system the rotational correction will be performed about differs each time a workpiece is supplied. Moreover, control data, stored in the robot, regarding the sensor coordinate system, and control data in the tool coordinate system, for deciding the feedback data of the robot control unit, are both processed upon being converted into data indicative of the fundamental coordinate system of the robot. As a result, calculating the amount of rotational correction which brings the reference vector into coincidence with the gripping direction vector is very complicated.

SUMMARY OF THE INVENTION

The present invention has been devised in view of the foregoing points and an object is to provide a robot control system capable of performing a tool position correction by simple processing based on position data received from a sensor.

A robot control system according to the present invention is adapted to execute a task at a predetermined position upon correcting a tool position offset of a robot, based on information indicative of the position of a workpiece. The robot control system includes a sensor arranged on a Z axis perpendicular to a coordinate plane (X-Y plane) parallel to a surface on which the workpiece rests, the coordinate axes of the sensor being fixed; and a robot calculation control unit for calculating an amount of rotational correction of a tool with regard to the sensor coordinate axes, from position information based on a vector indicating the gripping direction of the workpiece sensed by the sensor. If a rotational angle is determined from a projection of the gripping direction vector and the tool is subjected to a rotational correction with regard to the sensor coordinate axis (Zs, axis perpendicular to the surface on which the workpiece rests), then the tool position offset can be corrected even if the gripping direction vector of the workpiece is not parallel to the surface on which the workpiece rests.

DETAILED DESCRIPTION OF THE PREFERRED EMBODIMENTS

An embodiment of the present invention will now be described.

Figure 1:
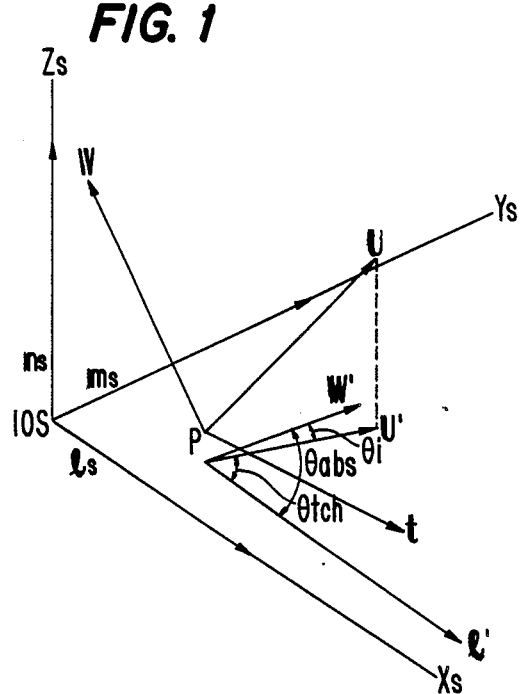
FIG. 1 is a view of the X, Y and Z coordinate axes illustrating a rotational correction of a tool vector according to an embodiment of the present invention.

Discussed first will be the manner in which a tool vector, subsequent to a tool rotational correction performed in relation to the Zs axis, is expressed in the sensor coordinate system Xs-Ys-Zs as shown in FIG. 1.

In FIG. 1, $t$, $u$, $v$ denote unit vectors along three axes Yt, Zt and Xt, respectively, of a tool 13 (FIG. 2) at a robot teach point P, where $ls$, $ms$, $ns$ represent unit vectors along three axes of the sensor coordinate system, and $Os$ denotes the origin of the latter coordinate system.

Let the components of each of the above-mentioned vectors in the fundamental coordinate system (X-Y-Z) (not shown) of the robot be expressed as follows:

$$\begin{matrix} ls & = & (Lsx, Lsy, Lsz)^T \\ ms & = & (Msx, Msy, Msz)^T \\ ns & = & (Nsx, Nsy, Nsz)^T \end{matrix} \quad (1)$$

From among the unit vectors, which decide the tool coordinate system at the teach point P, the vector $u$ is taken as a reference vector and the components thereof in the sensor coordinate system are expressed as follows:

$$\begin{pmatrix} Usx \\ Usy \\ Usz \end{pmatrix} = \begin{pmatrix} Lsx & Lsy & Lsz \\ Msx & Msy & Msz \\ Nsx & Nsy & Nsz \end{pmatrix} \begin{pmatrix} Ux \\ Uy \\ Uz \end{pmatrix} \quad (2)$$

where $(Usx, Usy, Usz) = us$, and $Ux, Uy, Uz$ are components of the reference vector $u$ expressed in the fundamental coordinate system. These vectors can be calculated from information relating to the teach point P, input when teaching is performed. If the unit vectors $l$, $m$, $ns$ in the sensor coordinate system are also transformed, into e.g. the fundamental coordinate system, and stored in the robot control system memory in advance, the reference vector $us$ expressed in the sensor coordinate system can be obtained from Eq. (2).

Next, an angle $\theta$tch defined by a vector, in the $X_s$-$Y_s$ plane parallel to the Xs-axis vector and a vector $u'$, obtained by projecting the reference vector $us$ onto the coordinate plane Xs-Ys is determined as follows:

$$\theta tch = \tan^{-1}(Usy/Usx) \quad (3)$$

An incremental correction amount $\theta i$ at the time the tool is subjected to a rotational correction can be determined in accordance with the following equation, based on $\theta$tch and the absolute value $\theta$abs of a rotational correction amount sensed on the sensor side:

$$\theta i = \theta abs - \theta tch \quad (4)$$

More specifically, the amount of tool position offset is correctly revised by rotating the tool about the Zs axis of the sensor coordinate system through an angle of rotation $\theta i$. The corrected tool vectors are obtained from $$\begin{pmatrix} Ucx \\ Ucy \\ Ucz \end{pmatrix} = \begin{pmatrix} Lsx & Msx & Nsx \\ Lsy & Msy & Nsy \\ Lsz & Msz & Nsz \end{pmatrix} \begin{pmatrix} Ci & -Si & 0 \\ Si & Ci & 0 \\ 0 & 0 & 0 \end{pmatrix} \begin{pmatrix} Usx \\ Usy \\ Usz \end{pmatrix} \quad (5)$$

where $Si = \sin\theta i$, $Ci = \cos\theta i$.

Substituting Eq. (2) into Eq. (5) and rearranging yields $$(\mu c) = (S) \begin{pmatrix} Ci & -Si & 0 \\ Si & Ci & 0 \\ 0 & 0 & 0 \end{pmatrix} (S)^{-1} (\mu) \quad (6)$$

This expresses the tool vector after it has been corrected so as to be brought into coincidence with a vector obtained by projecting the gripping direction vector of the workpiece onto the X-Y plane. It should be noted that $[\,S\,] = [ls\ ms\ ns]$.

Figure 2:
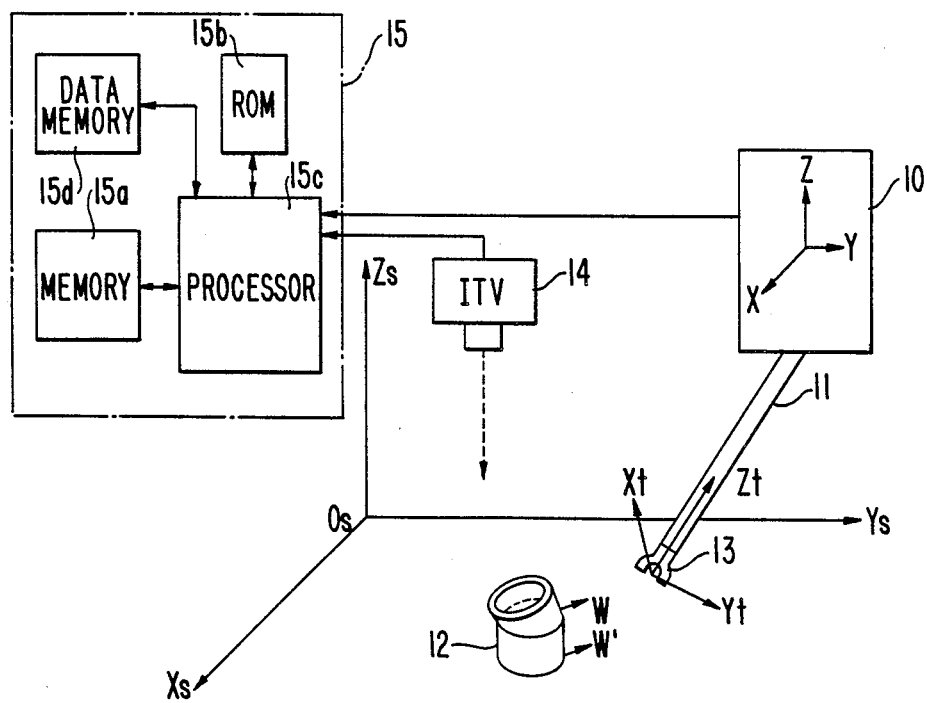
FIG. 2 is a schematic view illustrating an example of a robot system according to the above embodiment.

FIG. 2 is a block diagram illustrating an example of a teach/playback-type robot. A robot 10 has a hand 11 on which a tool 13 is mounted for gripping a supplied workpiece 12 at a predetermined position. The workpiece 12, is e.g. a pipe joint supplied to the robot 10 automatically. The gripping direction vector $w$ of the workpiece forms a predetermined angle with the surface on which the workpiece rests.

The robot 10 has a fundamental coordinate system X-Y-Z and is connected to a robot control unit 15 having a vision sensor 14 such as an industrial television (ITV). The robot control unit 15 has a memory 15a for storing robot command data, a control program memory (ROM) 15b, a processor 15c and a data memory 15d. The processor 15c executes the aforementioned rotational correction processing as well as other processing under the control of the control program. The memory 15a stores robot command data for controlling movement of the hand 11 of robot 10 along a predetermined path and for causing the hand to grip the workpiece 12 at the taught point P.

The vision sensor 14, which is connected to the processor 15c, is fixedly arranged in a coordinate system having an X-Y coordinate plane parallel to the surface on which the workpiece 12 rests. When the robot command data contains a preparatory code G45 for positional correction, the vision sensor 14 executes predetermined picture processing and supplies the data memory 15d with an input of data relating to a vector $w'$ obtained by projecting the gripping direction vector $w$ of the workpiece 12 onto the X-Y plane. The data memory 15d stores the unit vectors along respective axes of the tool coordinate system, which correspond to the tool 13. These unit vectors are stored as data in the fundamental coordinate system X-Y-Z of the robot 10.

In the robot system so constructed, data relating to the gripping direction vector $w'$ of workpiece 12 and supplied from the vision sensor 14 to the robot control unit 15 are supplied as data indicative of an angle formed with a predetermined axis of the sensor coordinate system. The corrected tool vector expressed by Eq. (6) is obtained by using the angle data so that command data for the robot 10, namely command values for each drive axis of the hand 11, may be prepared.

With the workpiece 12 in the above-described embodiment, the gripping direction or workpiece alignment vector $w$ is not necessarily parallel to the plane of the sensor coordinate system. However, in a case where the workpiece 12 is a rectangular parallelepiped, the gripping direction vector $w$ will always lie parallel to the surface on which the workpiece 12 rests. In any case, positional deviation of the workpiece 12 placed on the X-Y plane is eliminated by arranging the optic axis of the vision sensor 14 in parallel with the Zs axis of the sensor coordinate system.

As described in detail above, the amount of tool position offset can be corrected in the above-described embodiment merely by rotating the tool coordinate system about an axis parallel to the Zs axis of the sensor coordinate system at the time a position is taught. This makes it possible for the robot control unit of the present invention to execute processing more simply and at higher speeds than conventional robot control systems.

In the foregoing embodiment, the robot control system is described in relation to an operaton for gripping a workpiece 12. However, the present invention is not limited to this embodiment but can be applied to robots in which a working member (tool) mounted on a robot wrist can be made to deal with a variety of situations, such as arc welding. The present invention also applies to robots which, in connection with the teaching of the tool end position (TCP), can be set to a plurality of workpiece coordinate systems having a fixed relationship to the fundamental coordinate system of the robot.

According to the present invention, a command for correcting the positional rotation of a tool coordinate system is obtained through simple processing based on position information from a sensor, this being performed by teaching the end position (TCP) of a working member (tool) mounted on a wrist of a robot and executing a predetermined task. As a result, the position of the working member can be rotatively corrected and controlled. Although certain preferred embodiments have been shown and described, it should be understood that many changes and modifications may be made therein without departing from the scope of the appended claims.

We claim:

1. A robot control system adapted to execute a task using a tool at a predetermined position upon correction of a tool position offset of a robot, the correction being based on information indicative of a position of a workpiece supported by a working surface, said system comprising:

sensor means for sensing the position of the workpiece as represented by a gripping direction vector in a fixed coordinate system of said sensor means, the fixed coordinate system defined by a Z-axis substantially normal to the working surface, an X-axis and a Y-axis; and control means for calculating an amount of rotational correction of the tool, with regard to the fixed coordinate system of said sensing means, from position information based on the gripping direction vector of the workpiece sensed by said sensing means.

2. A robot control system according to claim 1, wherein said sensor means is a visual sensor having an optic axis fixed at a position parallel to the Z-axis.

3. A robot control system according to claim 1, wherein said control means includes:

memory means for storing conversion data representing a matrix for conversion between a robot coordinate system and a fixed coordinate system of said sensing means; and calculation means for determining robot command values for driving the robot, the robot command values specifying movement of the robot in a robot coordinate system independent of the fixed coordinate system of said sensor means, and for calculating the robot command values by converting a stored robot tool vector in the robot coordinate system into an initial sensor tool vector, producing a corrected sensor tool vector in dependence upon the initial sensor tool vector and an angle in the plane defined by the X-axis and the Y-axis between the projection of the initial sensor tool vector and the gripping direction vector, and converting the corrected sensor tool vector into a corrected robot tool vector using the conversion data stored in said memory means.

4. A robot control system according to claim 3, wherein said memory means includes first memory means for storing the robot command values.

5. A robot control system according to claim 4, wherein said memory means includes second memory means for storing the gripping direction vector.

6. A robot control system for controlling movement of a robot arm relative to a workpiece in response to a robot command specifying a position in a robot coordinate system and a workpiece alignment vector supplied to said robot control system by a workpiece position sensing system using a coordinate system independent of the robot coordinate system, said robot control system comprising:

memory means for storing conversion data representing a matrix for conversion between the robot coordinate system and the sensor coordinate system;

calculation means for calculating values used in the robot command by converting a stored robot tool vector in the robot coordinate system into an initial sensor tool vector, producing a corrected sensor tool vector in dependence upon the initial sensor tool vector and an angle between projections, in a plane defined by two axes in the sensor coordinate system, of the initial sensor tool vector and the workpiece alignment vector and converting the corrected sensor tool vector into a corrected robot tool vector using the conversion data stored in said memory means; and command means for controlling movement of the robot arm in dependence upon the robot command using the values calculated by said calculation means.

* * * * *